United States Patent [19]

Kovacs

[11] 4,232,957
[45] Nov. 11, 1980

[54] CAMERA MULTIPLE EXPOSURE CONTROL MECHANISM

[76] Inventor: John M. Kovacs, 45-2 Royal Crest Dr., Nashua, N.H. 03060

[21] Appl. No.: 73,196

[22] Filed: Sep. 7, 1979

[51] Int. Cl.$^3$ .................. G03B 19/02; G03B 17/26
[52] U.S. Cl. ................................ 354/209; 354/275
[58] Field of Search .................. 354/175, 207–209, 354/275

[56] References Cited

U.S. PATENT DOCUMENTS

| 3,911,456 | 10/1975 | Umemura | 354/209 |
| 4,168,896 | 9/1979 | Mielke | 354/209 X |

Primary Examiner—John Gonzales
Assistant Examiner—Thomas H. Tarcza
Attorney, Agent, or Firm—Robert H. Epstein

[57] ABSTRACT

A multiple exposure control mechanism for a photographic camera is incorporated in a film magazine having a film advance gear mechanism for driving a film take-up spool in response to rotation of a magazine activating gear in a camera body as the camera shutter is cocked. The film advance gear mechanism includes a main gear driven by the magazine activating gear and carrying a pawl rotatable therewith and movable into and out of engagement with an intermediate gear driving the film take-up spool via a film take-up gear, and the multiple exposure control mechanism includes a cam carried on the main gear for controlling the pawl and an actuating button selectively operable to move the cam to position the pawl out of engagement with the intermediate gear and prevent film movement to permit multiple exposures of a film frame.

10 Claims, 6 Drawing Figures

CAMERA MULTIPLE EXPOSURE CONTROL MECHANISM

BACKGROUND OF THE INVENTION

1. Field of the Invention

The present invention pertains to photographic cameras and, more particularly, to multiple exposure control mechanisms for photographic cameras of the type having a film magazine with a take-up spool driven when the shutter in a camera body is cocked.

2. Discussion of the Prior Art

Photographic cameras of the type having a film magazine coupled with a camera body, such as the Hasselblad camera manufactured by Victor Hasselblad Aktiebolag of Goteborg, Sweden, conventionally advance film from a supply spool to a take-up spool in response to manual or powered cocking of the shutter in the camera body by transmitting power to a film take-up gear which pulls the film from the supply spool to a position of exposure and winds the film onto the take-up spool. The winding action in the film magazine is, thus, mechanically connected to the shutter cocking mechanism of the camera body and ensures that whenever the shutter is cocked, the film is advanced one frame to prevent the accidental multiple exposure of any particular frame of film. However, there are occasions when photographers want to intentionally multiple expose a single frame of film to achieve artistic effects and for other reasons. When a photographer desires to multiple expose a particular frame of film using a Hasselblad camera, the camera must be cocked by manually or electrically activating the shutter cocking mechanism in the camera body to lower the mirror, cock and open the shutter, and advance the film one frame. The camera is thereafter aimed and focused at the desired scene or subject to be photographed, and the shutter release button is activated to permit exposure of the film frame to the light reflected from the desired scene or subject. A light shield is then inserted into the film magazine to protect the exposed frame of film from additional light, and the film magazine is detached from the camera body, the light shield preventing any light from striking the previously exposed film frame. The shutter cocking mechanism is now recocked; and, since the film magazine is detached from the camera body, the position of the previously exposed film frame is not affected. The film magazine is now reattached to the camera body, and the light shield is removed from the magazine such that the previously exposed film frame is now in a position to be re-exposed when the shutter is activated. The photographer now aims and focuses the camera at the scene or subject which is desired to be super-imposed on the previously exposed film frame, and, when the shutter release button is activated, light from the desired scene or subject is reflected onto the previously exposed film frame to create a double exposure. If additional exposures on the same film frame are desired, the photographer must repeat the above steps.

The steps required to multiple expose film frames, as above described, have the disadvantages of being awkward, cumbersome and time consuming and represent a deterrent to the obtention of desired photographic effects by photographers. Accordingly, Hasselblad has developed a camera, Model 2000FC, permitting multiple exposures without detaching the film magazine from the camera body; however, this feature is incorporated in the camera body and not in the film magazine and, thus, prior camera models cannot be modified to selectively permit multiple exposures using this concept.

U.S. Pat. Nos. 2,218,241 to Hughey, 2,345,999 to Babcock, 2,559,880 to Kesel et al, 2,672,797 to Blattner, 2,819.664 to Elton, 2,868,099 to Weiss, 3,621,770 to Tsuruoka, 3,687,039 to Furuta, 3,688,671 to Irwin, 3,829,876 to Uno et al, 3,864,706 to Urano, 3,911,456 to Umemura, 3,968,508 to Ikeuchi and 4,017,875 to Yamamichi are representative of prior art mechanisms permitting multiple exposures with photographic cameras; however, none of these mechanisms are of a design and simplicity to allow modification of existing film magazines to permit multiple exposing of film frames.

SUMMARY OF THE INVENTION

Accordingly, it is a primary object of the present invention to overcome the above mentioned disadvantages of the prior art by providing a multiple exposure control mechanism that can be quickly, simply and inexpensively added to existing film magazines for photographic cameras.

Another object of the present invention is to modify a film magazine by adding a cam operated by an actuating button to control a pawl coupling a main gear, driven by a magazine activating gear in a camera body, with an intermediate gear driving a film take-up spool.

The present invention has a further object in that inadvertent actuation of a multiple exposure control mechanism for addition to a film magazine is minimized and tactile feedback is provided to indicate selection of a multiple exposure mode of operation.

Some of the advantages of the present invention over the prior art are that the multiple exposure control mechanism has a minimum number of parts and can be simply installed in existing film magazines, and the multiple exposure control mechanism is extremely reliable and is automatically returned to an inoperative state prior to a subsequent exposure to prevent inadvertent multiple exposures.

The present invention is generally characterized in a multiple exposure control mechanism for a camera having a body with a magazine activating gear operable as a shutter is cocked to drive a film take-up spool via a film advance gear mechanism including a main gear driven by the film advance gear and intermediate gear coupling the main gear with the film take-up spool in a film magazine detachably connected with the camera body, the multiple exposure control mechanism including a pawl carried on and rotatable with the main gear and movable into and out of engagement with the intermediate gear, a cam carried on the main gear having a cam surface positioned to engage the pawl and movable to control movement of the pawl relative to the intermediate gear; and an actuating button mounted on the film magazine and selectively movable to engage and move the cam against the pawl whereby the actuating button controls engagement of the pawl with the intermediate gear to selectively prevent the magazine activating gear from driving the film take-up spool when the shutter is cocked thereby permitting multiple exposures of a film frame.

Other objects and advantages of the present invention will become apparent from the following description of the preferred embodiment taken in conjunction with the accompanying drawings.

DESCRIPTION OF THE PREFERRED EMBODIMENT

Figure 1:
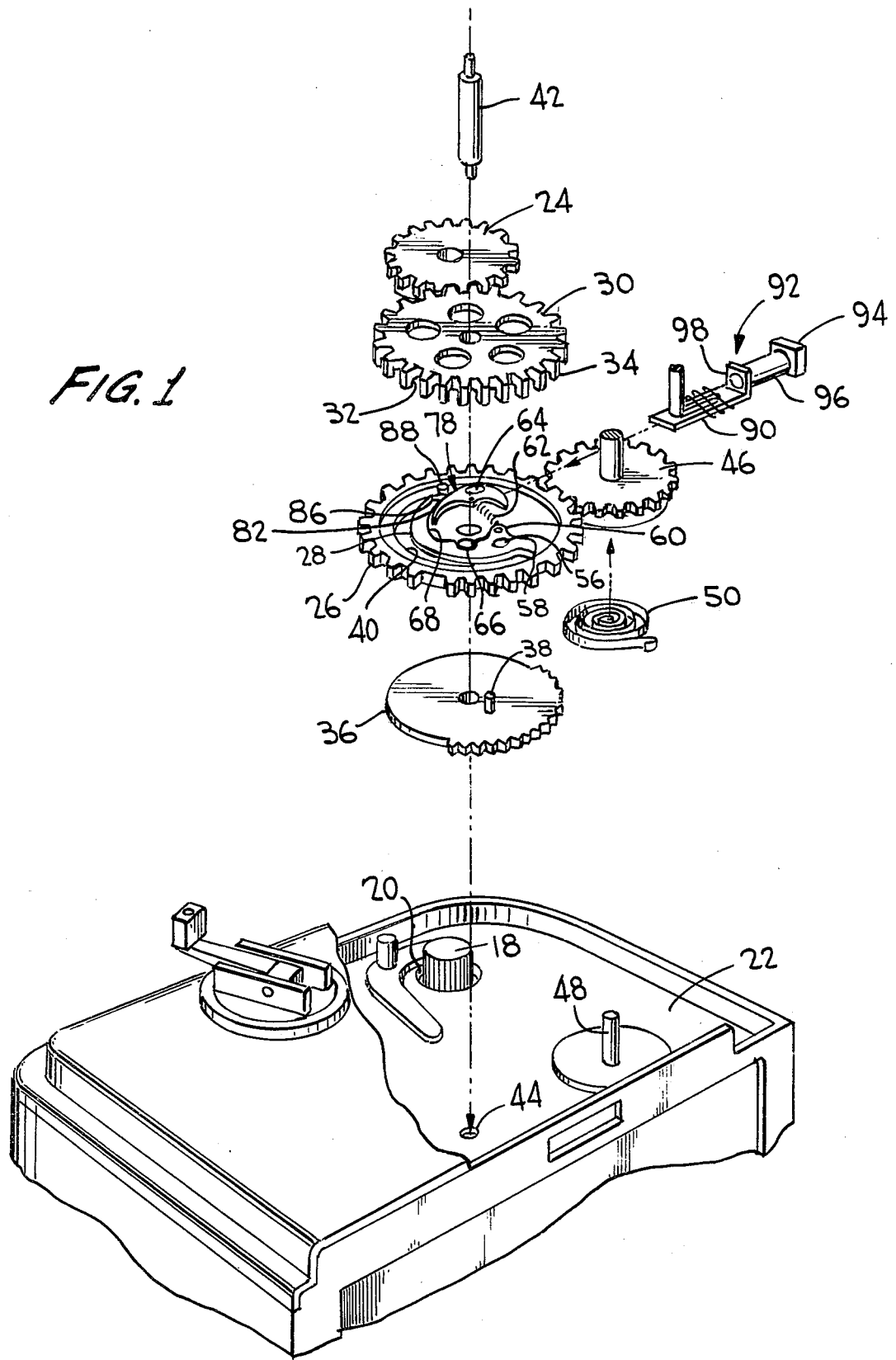
FIG. 1 is an exploded view of a camera multiple exposure control mechanism according to the present invention.
Figure 2:
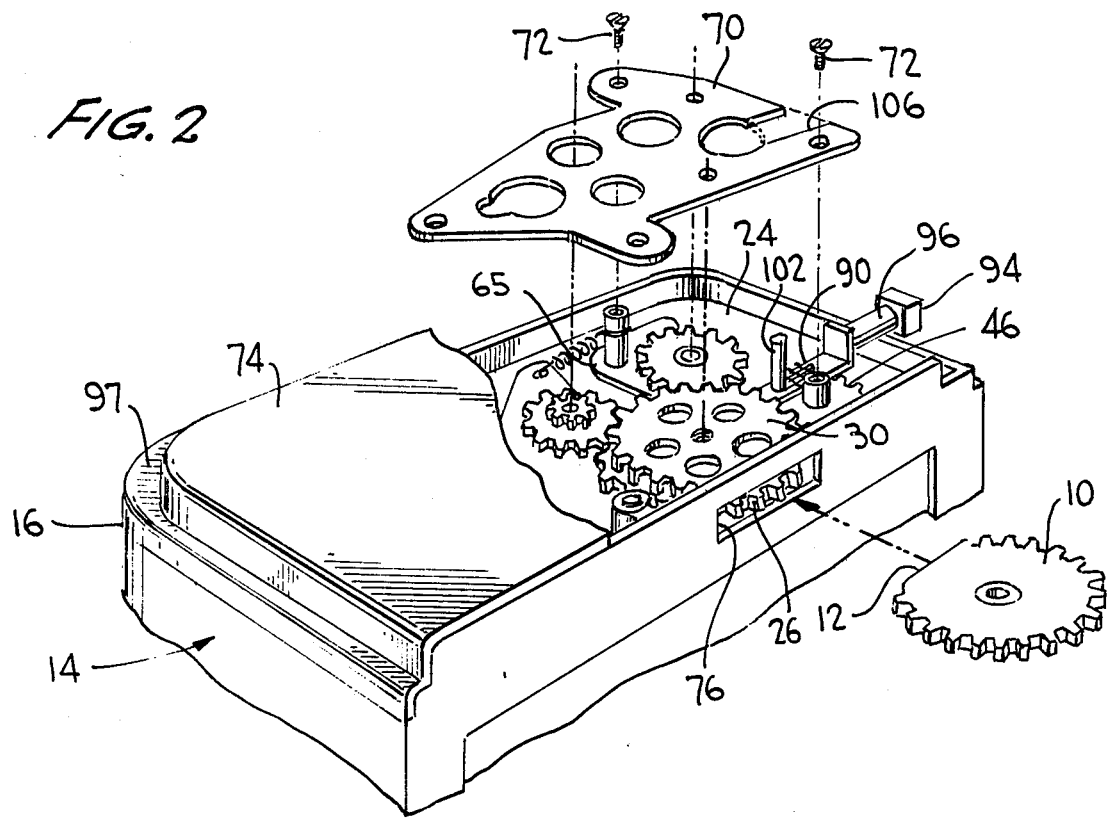
FIG. 2 is a perspective view of the camera multiple exposure control mechanism of the present invention with parts broken away.

A control mechanism for a camera film magazine to selectively permit multiple exposures is illustrated in FIGS. 1 and 2 for use with a camera body (not shown) having a magazine activating gear 10 driven either automatically or manually by means of a knob or crank. While the present invention can be used with any camera utilizing a film magazine, the present invention is particularly adapted for use with Hasselblad cameras manufactured by Victor Hasselblad Aktiebolag of Goteborg, Sweden, and reference is made to such Hasselblad cameras for more detail relative to the optical mechanical and electrical structure within the camera body. For the purposes of understanding the present invention, it is important to recognize only that the magazine activating gear 10 undergoes a 360° rotation in preparation for taking a photograph, the mechanism rotating the magazine activating gear also cocking the shutter. The magazine activating gear 10 has teeth around its periphery with the exception of a flat segment 12.

A film magazine 14 includes a housing 16 for receiving film on supply and take-up spools (not shown), the take-up spool having an end received in a knurled knob 18 extending through an aperture 20 in an end wall 22 of housing 16. The knob 18 engages internal teeth of a film take-up gear 24 which is driven by the magazine activating gear 10 via a gear train including a main gear 26 pivotally carrying a pawl 28 and an intermediate gear 30 disposed coaxially over the main gear and having internal teeth 32 for engagement with pawl 28 and external teeth 34 engaging take-up gear 24. A spacing gear 36 is mounted coaxially below main gear 26 and carries a post 38 extending through an arcuate opening 40 in the main gear to engage pawl 28. The main gear 26, intermediate gear 30 and spacing gear 36 are coaxially mounted on a pin 42 received in a hole 44 in the end wall 22 of the housing 16, and a return gear 46 is rotatably mounted on a post 48 on the end wall to engage the teeth of main gear 26 and is biased in a counterclockwise direction looking at FIG. 1 by a flat wound spring 50 received within the return gear.

Figure 6:
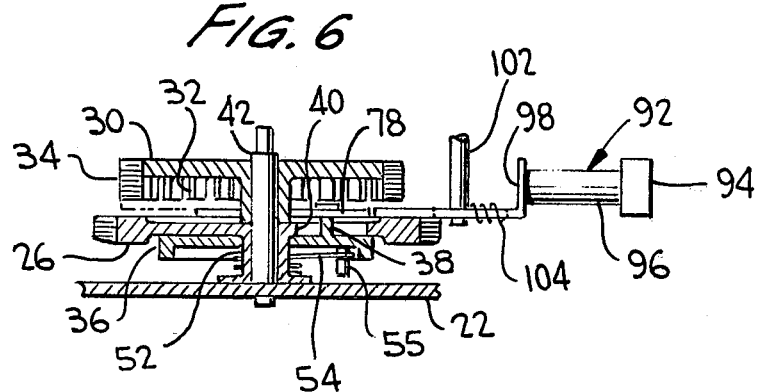
FIG. 6 is a side elevation in section of the multiple exposure control mechanism of the present invention.

The spacing gear 36 is mounted on a hub 52 of the main gear, as best shown in FIG. 6; and, a spring 54 is coiled around the hub and has one end secured thereto and an opposite end engaging a pin 55 depending from the spacing gear, the spring 54 biasing the spacing gear counterclockwise, looking at FIG. 1, to cause the post 38 to abut an end of opening 40 adjacent a pivot pin 56 pivotally mounting the pawl 28 on the main gear 26. The pawl 28 has a tip 58 for engaging the internal teeth 32 of intermediate gear 30, an ear 60 having a hole therein receiving one end of a coil spring 62 having an opposite end normally connected to a pin 64. A stop 65 is supported on the end wall 22 of housing 16 and has a leg positioned to engage pin 56 as the main gear and the spacing gear rotate such that with continued rotation of the main gear, the post 38 will be moved from its normal position in a recess 66 in an inner cam surface 68 of the pawl 28 to ride along the cam surface and pivot the pawl counterclockwise, looking at FIG. 1, to move the tip 58 out of engagement with the internal teeth 32 of the intermediate gear 30. The film advance gear mechanism is held in place by a plate 70 and screws 72, and a cover 74 is carried on the housing to enclose the gear mechanism with a slot 76 in a side wall of the housing permitting meshing of main gear 26 and magazine activating gear 10 when the magazine is mounted on the camera body.

As thus far described, the structure of the magazine gear mechanism is conventional and used in the various Hasselblad magazines, including Models A12, A16, A16S, A24, 12, 16, 16S and 24. For more detail relative to the structure and function of the film advance gear mechanism as well as the counter and metering gear mechanisms in the magazine, reference is made to the above Hasselblad magazines and to U.S. Pat. No. 3,128,687, it being important to understanding the present invention only to understand the basic function of the conventional film advance gear mechanism. To this end, the operation of the film advancing gear mechanism is such that, when the magazine activating gear 10 undergoes a 360° rotation with cocking of the shutter in the camera body, the main gear 26 will be rotated, and the tip 58 of the pawl 28 will be engaged with the internal teeth of the intermediate gear 30 to rotate the intermediate gear and, therefore, turn the film take-up gear 24 to take up film on the take-up spool. The amount of film take up with each rotation of the magazine activating gear 10 is controlled by engagement of the teeth of spacing gear 36 with an arm (not shown) which, as described above, causes the post 38 to move from recess 6 and ride along cam surface 68 to pivot the pawl and move the tip 58 out of engagement with the intermediate gear to prevent further rotation of the take-up gear. Continued rotation of the main gear 26, thus, does not affect film take-up; and, once magazine activating gear 10 has been rotated 360°, flat segment 12 will be aligned with the main gear thereby permitting the energy stored in spring 50 as return gear 46 is rotated by the main gear to reverse the direction of rotation of the main gear and return the main gear to its initial position.

The multiple exposure control mechanism of the present invention utilizes the film advancing gear mechanism of the magazine and, simply stated, controls the position of the pawl 28 to prevent the main gear from rotating the intermediate gear during the entire revolution of the magazine activating gear 10. The control mechanism includes a cam 78 pivotally mounted on main gear 26 on pin 64 and having a curved actuating end 80 on one side of pin 64 and a curved cam surface 82 on an opposite side of pin 64. The spring 62 is moved from pin 64 to be received in a hole of cam 78 slightly removed from pin 64 toward the cam surface 82 such that the cam is biased counterclockwise to move the cam surface into light contact with the inner curved surface 68 of pawl 28. The cam is preferably made of plastic to facilitate movement of the cam against the pawl, and the radius of curvature of the outer cam surface is greater than the radius of curvature of the inner curved surface 68 of the pawl such that the cam contacts the pawl only at a small portion adjacent a pointed end 84 of the cam to additionally facilitate movement of the cam along the pawl. The end of pawl 28 has a notch 86 formed therein to receive and hold the cam end 84, and a stop 88 is carried on the main gear at a position to engage the outer surface of the cam when end 84 is received in notch 86 to prevent the cam from moving beyond the pawl.

The intermediate gear 30 has its teeth ground down about 0.012 inch to provide sufficient space between the intermediate and main gears for movement therebetween of a blade 90 of an actuating button 92 mounted at the periphery of the cover 74. The actuating button 92 has a head 94 external of the cover and mounted on a stem 96 passing through a hole in the cover to position the head 94 at a recessed peripheral shoulder 97 of the cover, the stem terminating at an upstanding leg 98 of the blade, and the blade 90 has a slot 100 therein receiving a stud 102 secured to the cover to limit sliding movement of the blade. A spring 104 is wrapped around the blade between stud 102 and an end of slot 100 to bias the actuating button out of the cover to an inoperative position. The plate 70 has a notch 106 to accommodate the stud and the actuating button.

Figure 3:
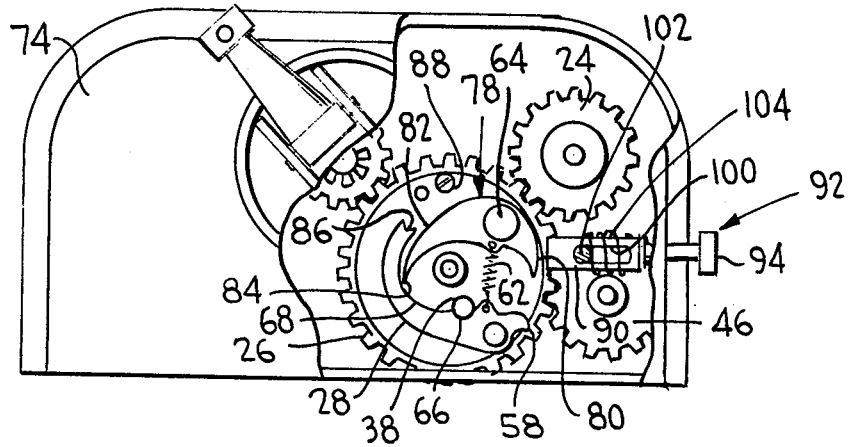
FIGS. 3 and 4 are broken top views of the camera multiple exposure control mechanism of the present invention in the single exposure and multiple exposure states, respectively, with the intermediate gear removed.

In operation, the spring 104 will normally bias the actuating button 92 to the inoperative position; and, with the actuating button 92 in the inoperative position, the cam 78 will be in the position shown in FIG. 3 within the pawl 28 and will not interfere with normal single exposure operation of the camera. That is, each time the shutter is cocked in the camera body, the magazine activating gear 10 will move the film take-up gear 24 to position a new film frame in the magazine such that each film frame will receive only a single exposure.

Figure 4:
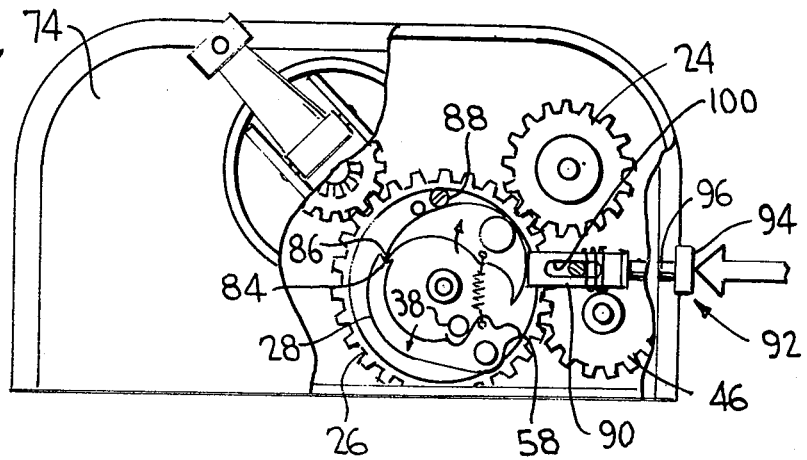
Figure 5:
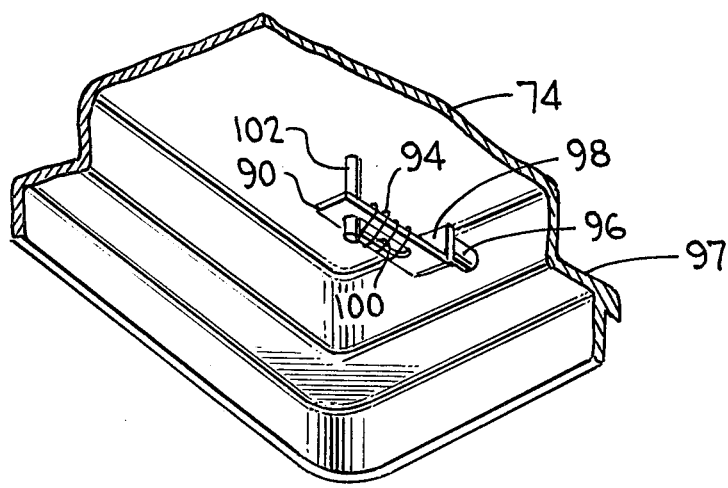
FIG. 5 is a broken perspective of the actuating button for the multiple exposure control mechanism of the present invention.

In order to multiple expose a film frame, an initial exposure is taken with the actuating button remaining in the inoperative position. Once the initial exposure is taken, the actuating button 92 is depressed to cause the blade 90 to move between the intermediate and main gears and engage the actuating end of cam 78 to pivot the cam clockwise, as shown in FIG. 4, such that the cam surface bears against pawl 28 to pivot the pawl counterclockwise. When the actuating button 92 is fully depressed, the cam 78 will be moved sufficiently for end 84 to be received in notch 86 in the end of the pawl with the outer surface of the cam abutting stop 88. The engagement of the tip in the notch locks the pawl and cam in position with the tip 58 of the pawl moved out of engagement with the internal teeth of the intermediate gear 30 such that the actuating button can return to the inoperative position while the film advance gear mechanism remains in an uncoupled condition. That is, cocking of the shutter and turning of the magazine activating gear 10 will have no affect on the film take-up gear and spool such that the film frame will not be moved as the shutter is cocked, and the subsequent exposure will be on the same film frame when the shutter release button is depressed.

After rotation of the magazine activating gear 10 has been completed to align the flat segment 12 with the main gear 26, the return gear 46 will return the main gear to its initial position due to the force from spring 50, and the combined force from spring 50 and spring 54 jars the pawl and cam as the post 38 is returned to recess 66 such that the end 84 of the cam is dislodged from the notch 86 of the pawl thereby automatically returning the control mechanism to an inoperative state. Accordingly, subsequent cocking of the shutter will move the film frame unless the actuating button is again depressed to set the cam and pawl in the multiple exposure state.

The camera multiple exposure control mechanism of the present invention has the advantages that the actuating button 92 is positioned at a recessed peripheral shoulder of the cover so as not to be in a position to be inadvertently depressed and the actuating button must be fully depressed to set the pawl and cam in the multiple exposure state, an incomplete depression of the actuating button 92 failing to lock the end of the cam in the notch of the pawl. Additionally, the locking of the cam with the pawl provides tactile feedback to the photographer to indicate that the camera is in a multiple exposure mode of operation. The automatic resetting of the multiple exposure control mechanism after each cocking of the shutter has the advantage of requiring an overt action by the photographer for each multiple exposure to thereby avoid the obtention of undesired multiple exposures.

Inasmuch as the present invention is subject to many variations, modifications and changes in detail, it is intended that all subject matter discussed above or shown in the accompanying drawings be interpreted as illustrative and not in a limiting sense.

What is claimed is:

1. A multiple exposure control mechanism for a camera having a body with a magazine activating gear operable as a shutter is cocked to drive a film take-up spool via a film advance gear mechanism including a main gear means driven by the magazine activating gear and intermediate gear means coupling the main gear means with the film take-up spool in a film magazine detachably connected with the camera body, said multiple exposure control mechanism comprising
  pawl means carried on and rotatable with the main gear means and movable into and out of engagement with the intermediate gear means;
  cam means carried on the main gear means having a cam surface positioned to engage said pawl means and movable to control movement of said pawl means relative to the intermediate gear means; and
  actuating means mounted on the film magazine and selectively movable to engage and move said cam means against said pawl means whereby said actuating means controls engagement of said pawl means with the intermediate gear means to selectively prevent the magazine activating gear from driving the film take-up spool when the shutter is cocked thereby permitting multiple exposures of a film frame.

2. A multiple exposure control mechanism as recited in claim 1 wherein said pawl means is pivotally mounted on the main gear means and has an end with a notch therein, and said cam means is pivotally mounted on the main gear means and has an end received in said notch when said actuating means is operated to hold said pawl means in a position out of engagement with the intermediate gear means.

3. A multiple exposure control mechanism as recited in claim 2 wherein said pawl means has an inner curved surface, said cam means has an actuating end and an outer curved cam surface engaging said inner curved surface of said pawl means, and said actuating means includes blade means for engaging said actuating end of said cam means to pivot said cam means and move said curved cam surface against said inner curved surface of said pawl means to position said end of said cam means in said notch in said pawl means.

4. A multiple exposure control mechanism as recited in claim 3 wherein said cam means is made of plastic and the radius of curvature of said curved cam surface is greater than the radius of curvature of said inner curved surface of said pawl means.

5. A multiple exposure control mechanism as recited in claim 3 and further comprising spring means storing energy when the magazine activating gear rotates the main gear means for reversing the direction of rotation of the main gear means after the shutter is cocked to dislodge said end of said cam means from said notch in said pawl means to automatically return said multiple exposure control mechanism to an inoperative state.

6. A multiple exposure control mechanism as recited in claim 5 wherein the film advance gear mechanism is disposed in a housing having a cover with a recessed peripheral shoulder, and said actuating means includes a button extending through the cover and positioned at the peripheral shoulder, said button carrying said blade means positioned between the main gear means and the intermediate gear means and spring means biasing said blade means away from said cam means.

7. A multiple exposure control mechanism as recited in claim 6 wherein said cam means is made of plastic and further comprising a stop carried on the main gear means to engage said cam means and limit pivotal movement thereof.

8. A multiple exposure control mechanism as recited in claim 1 wherein operation of said actuating means locks said cam means with said pawl means with said pawl means out of engagement with the intermediate gear means and further comprising spring means storing energy when the magazine activating gear rotates the main gear means for reversing the direction of rotation of the main gear means after the shutter is cocked to dislodge said cam means from said pawl means to automatically return said multiple exposure control means to an inoperative state.

9. A multiple exposure control mechanism as recited in claim 1 wherein the film advance gear mechanism is disposed in a housing having a cover with a recessed peripheral shoulder, and said actuating means includes a button extending through the cover and positioned at the peripheral shoulder, said button carrying blade means for engaging said cam means and positioned between the main gear means and the intermediate gear means and spring means biasing said blade means away from said cam means.

10. A multiple exposure control mechanism as recited in claim 1 wherein said pawl means is pivotally mounted on the main gear means and said cam means is pivotally mounted on the main gear means and has a curved cam surface for engaging and moving said pawl means.

* * * * *